Patented Oct. 17, 1939

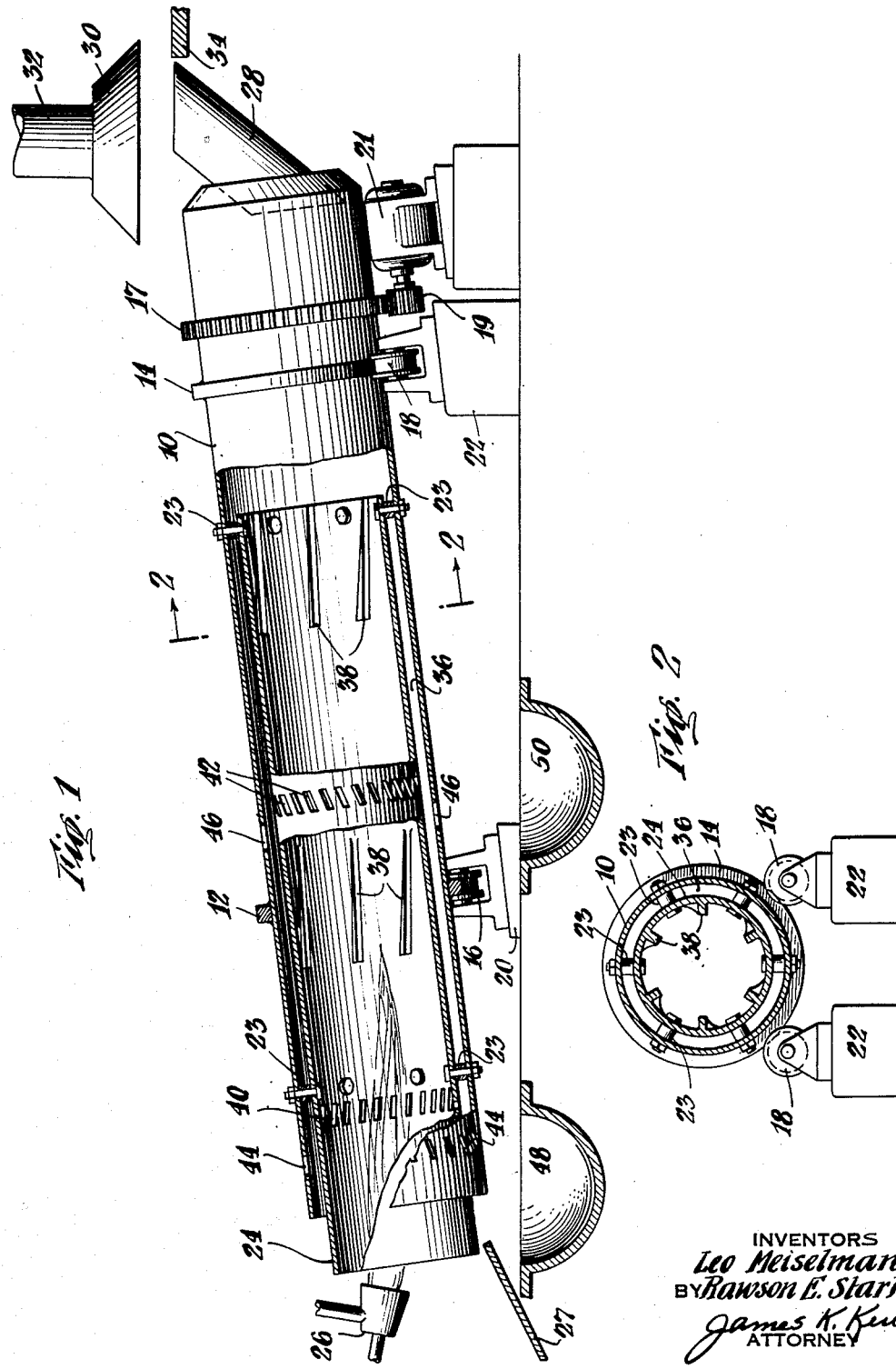

2,176,267

UNITED STATES PATENT OFFICE 2,176,267

SWEATING FURNACE

Leo Meiselman, Pittsburgh, and Rawson E. Stark, Carnegie, Pa., assignors to American Smelting and Refining Company, New York, N. Y., a corporation of New Jersey Application November 27, 1937, Serial No. 176,879

6 Claims. (Cl. 266—33)

This invention relates to apparatus of the type ordinarily referred to as sweating furnaces for separating more readily fusible metals from those of lesser fusibility.

Among other features, the invention provides an efficient sweating furnace of simple design which readily lends itself to the treatment of various and sundry secondary metals and scrap materials.

Various other features and advantages of the invention will be apparent from the following particular description and from an inspection of the accompanying drawing.

In the drawing, Fig. 1 is a side elevation, with parts broken away, of an apparatus embodying the invention, and Fig. 2 is a cross section taken on the line 2—2 of Fig. 1.

Referring more particularly to the drawing, 10 is a steel drum having runners 12 and 14 affixed to its periphery and engaging grooved rolls 16 and 18, the rolls being supported by foundations 20 and 22 of unequal heights. Also, on the periphery of drum 10 is gear ring 17 which meshes with gear 19 of driving motor 21. A second drum 24 is positioned within the drum 10 for a major portion of the latter's length and secured thereto by spacing bolts 23. The lower end of the inner drum 24 extends out of the drum 10 and forms the discharge end of the furnace. A burner 26 and discharge grate 27 are provided at the discharge end of the furnace while at the other end is charging chute 28. Hood 30 and stack 32 are positioned above chute 28 and a part of the charging platform 34.

Drums 10 and 24 are of a sufficient difference in diameter to provide a space 36, of say three or four inches, between the walls of the respective drums. Lugs 38 are affixed to the inner surface of drum 34 while bands of slots 40 and 42 are provided in the wall thereof at an angle to the longitudinal axis of the furnace. Similar bands of slots 44 and 46 are provided in the wall of drum 10 but a bit nearer the discharge end of the furnace. Below the slot bands in drum 10 are pots or troughs 48 and 50.

In operation, the material to be treated, e. g., scrap combustion engine radiators, is charged from the platform 34 into chute 28. As the furnace rotates, the articles charged progress toward the lower end of the furnace and the more readily fusible metals are melted by heat supplied by burner 26. The lugs 38 serve to lift and drop the articles during their passage through the furnace thereby facilitating the separation of the fused constituents of the charge from those not fused.

The fused metal, e. g., solder in the case of treating scrap radiators, collects in the space 36 between the drums 10 and 24 and is discharged therefrom through the slot bands 44 and 46 into pots or troughs 48 and 50, respectively, from which it is cast. It will be apparent that spacing bolts 23 and slot bands 40 and 42 provide for the ready passage of the fused metal into space 36.

Following the sweating operation, the unfused constituents of the charge are discharged over grate 27 which effects a separation of small pieces, dirt, etc. from the other unfused constituents. The spent combustion gases emerge from the charging end of the furnace and are withdrawn through stack 32 via hood 30. By controlling the amount of charge in the furnace, the latter is made to serve as its own damper.

The advantages of the furnace of the invention, from both the standpoint of construction and from that of operation, will be at once apparent. The furnace is relatively inexpensive and is constructed with ease. The space between the two drums prevents heat losses and the bands of slots in the inner drum permit ready removal of the fused metal from the unfused constituents of the charge and the path of flow of the heating medium.

While certain novel features of the invention have been disclosed and are pointed out in the annexed claims, it will be understood that various omissions, substitutions and changes may be made by those skilled in the art without departing from the substance of the invention.

What is claimed is:

1. A sweating furnace comprising two telescoping drums inclined from the horizontal and defining a space between the walls of said drums, and bands of slots in the respective walls of said drums permitting flow of fused metal from the interior of the drum of smaller diameter into said space and thence out of said furnace.

2. A rotative sweating furnace having a tubular heating chamber surrounded, in part at least, by a tubular member defining a collecting chamber therebetween, passageways between said heating chamber and said collecting chamber, and passageways in the wall of the outer tubular member for withdrawing fused metal from said collecting chamber.

3. The combination with a multiple-walled, tubular sweating furnace inclined from the horizontal having means for tumbling articles in their passage therethrough, the furnace walls being mounted one on the other and defining a space therebetween, of bands of slots in the walls of said furnace for withdrawing fused metal from the furnace.

4. A rotary sweating furnace having two concentric walls of different diameters, said walls being fixedly secured to each other and defining contiguous fusing and collecting chambers with passageways therebetween, means for tumbling articles in said fusing chamber, and a grate at the discharge end of said furnace.

5. Apparatus for separating metals of dissimilar fusibility comprising a first tube mounted at an angle to the horizontal, a smaller second tube extending into said first tube for at least a substantial part of its length and positioned therein to form an annular space between the respective walls of said tubes, mounting means securing said tubes each to the other in fixed relationship and rendering said tubes immovable with reference to each other, openings in the wall of said second tube, means within said second tube for tumbling articles passed therethrough, and means for rotating the aforementioned structure.

6. Apparatus for separating metals by fusion comprising an inclined rotary furnace having a circular heating chamber, an annular fused metal chamber around said heating chamber, means mounting said chambers each on the other and rendering each immovable with respect to the other, fused metal passageways between said chambers, and means in said heating chamber for tumbling articles passed therethrough.

LEO MEISELMAN.
RAWSON E. STARK.